United States Patent [19]
Wahl

[11] 3,984,655
[45] Oct. 5, 1976

[54] TERMINAL MEMBERS OF AN ELECTRIC TOOL FOR RECEIVING DETACHABLE TIPS

[75] Inventor: John F. Wahl, Sterling, Ill.

[73] Assignee: Wahl Clipper Corporation, Sterling, Ill.

[22] Filed: May 19, 1975

[21] Appl. No.: 578,828

[52] U.S. Cl. .............................. 219/233; 219/238; 219/533; 219/541; 339/58
[51] Int. Cl.[2] ...................... H05B 3/02; B23K 3/04; H01R 11/22
[58] Field of Search ........... 219/233, 235, 240, 229, 219/236, 238, 237, 533, 541; 279/1 SG, 102, 96; 339/95 D, 260, 261, 108 R, 58

[56] References Cited
UNITED STATES PATENTS

| | | | |
|---|---|---|---|
| 957,485 | 5/1910 | Beliveau | 339/260 |
| 985,821 | 3/1911 | Manson | 339/260 X |
| 1,648,798 | 11/1927 | Crook | 279/102 |
| 1,683,370 | 9/1928 | Pacent | 339/95 D |
| 2,796,507 | 6/1957 | Young | 219/233 |
| 3,899,654 | 8/1975 | Walton | 219/230 X |

Primary Examiner—A. Bartis
Attorney, Agent, or Firm—Edward U. Dithmar

[57] ABSTRACT

Terminal members of an electric tool, such as a soldering iron or the like, for receiving detachable tips wherein each tip has a pair of electrical conductors which are detachably secured to the terminal members. Each terminal member is an electrically conducting member having a longitudinal bore to receive a tip conductor, the mouth of the bore preferably being conically countersunk to facilitate conductor entry. A spring member, secured to the terminal member by a set screw inserted into a threaded opening intersecting the longitudinal bore remote from the mouth thereof, has a portion overlying the bored end of the member, the portion being movable transversely in opposition to spring bias. The overlying portion of the spring member has an opening therein to receive a tip conductor, the opening when the spring member is unflexed being misaligned with the bore, whereby the spring member is flexed to align the opening and bore to receive a conductor, and the conductor is detachably secured mechanically and electrically to the terminal member by action of the flexed spring member.

6 Claims, 6 Drawing Figures

TERMINAL MEMBERS OF AN ELECTRIC TOOL FOR RECEIVING DETACHABLE TIPS

BACKGROUND OF THE INVENTION

This invention relates to terminal members of an electric tool for receiving detachable tips, and more particularly to terminal members whereby a tip easily and quickly may be attached to and detached from the tool which, for example, may be a cordless electric soldering iron.

Cordless soldering irons of the general type with which this invention advantageously may be used have been sold for some time by applicant's assignee. Such previously and currently sold soldering irons have a pair of terminal members for mounting a soldering tip, each terminal member having a longitudinal bore adapted to receive a conductor forming part of the tip. Each terminal member has a transverse threaded opening intersecting the longitudinal bore, and a set screw threaded in the opening functions to secure the conductor positively in the bore of the terminal. The set screws are eminently satisfactory when a single soldering tip is used for an extended period, but are somewhat disadvantageous in instances where the tips are subject to frequent change.

The present invention, as will be seen, enables tips of various sizes and shapes to be attached to and detached from the tool easily and quickly, and without the use of a screwdriver or the like.

SUMMARY OF THE INVENTION

The invention contemplates terminal members of an electric tool having a tip which includes a pair of electrical conductors. The tool, of course, has two terminal members, one for each conductor of the tip.

Each terminal member is an electrically conducting member having a longitudinal bore adapted to receive a tip conductor. A spring member mounted in effective relation with the terminal member has a portion overlying the bored end of the member, the portion being movable transversely thereof in opposition to spring bias.

The overlying portion of the spring member has an opening to receive a tip conductor, the opening when the spring member is unflexed being misaligned with the bore in the terminal member. The spring member is flexed to align the opening and bore to receive a tip conductor, the conductor being secured to the terminal member mechanically and in electrically conducting relation by the flexed spring member.

In more detailed aspect, the mouth of the bore in the terminal member is conically countersunk to facilitate conductor entry, and the opening in the spring member is defined by a flared mouth for facilitating insertion of the conductor and by a cylindrical length extending toward the terminal member for increasing surface contact between conductor and spring member to avoid undue wear.

The terminal member of the invention also has a transverse threaded opening intersecting the longitudinal bore near the inner end thereof and a set screw in the threaded opening for securing the spring member to the terminal member and, if desired, for positively locking the conductor in the terminal member.

Other objects, advantages and details of the invention will be apparent as the description proceeds, reference being had to the accompanying drawing wherein two forms of the invention are shown. It is to be understood that the description and drawing are illustrative only, and that the scope of the invention is to be measured by the appended claims.

DESCRIPTION OF THE PREFERRED EMBODIMENT

Figure 1:
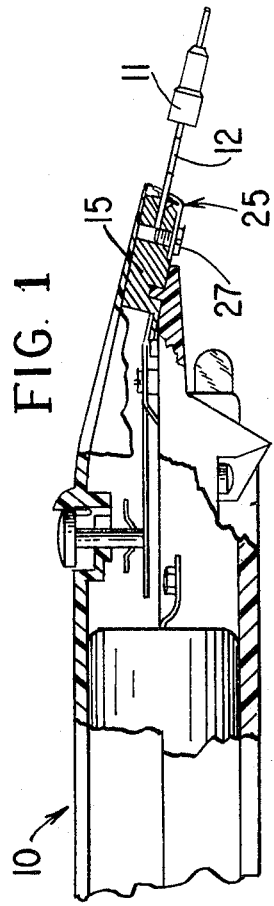
FIG. 1 is a fragmentary elevational view, partly broken away and partly in section, of an electric tool having terminal members embodying the invention.
Figure 2:
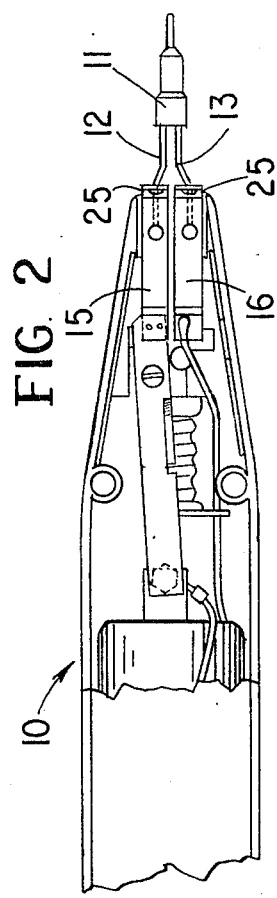
FIG. 2 is a fragmentary top view, partly broken away, of the tool shown in FIG. 1.

Referring to the drawing, FIGS. 1 and 2 show an electric tool 10 in the form of a cordless soldering iron having a detachable tip 11. As shown in FIG. 2, tip 11 includes a pair of electrical conductors 12 and 13 adapted to be connected to terminal members of the tool.

Tip 11 may be one of a plurality of tips of different shapes, sizes and capabilities, and it is desirable to attach and detach the tips quickly and easily. The present invention, as will be seen, provides this advantage.

Still referring to FIG. 2, tool 10 includes a pair of terminal members 15 and 16 located at the forward end of the tool. Terminal members 15 and 16 are of electrically conducting material, and mounted so as to be electrically insulated from each other. The illustrated terminal members are of like construction, and details of member 15 are shown in enlarged FIGS. 3 – 5.

Figure 3:
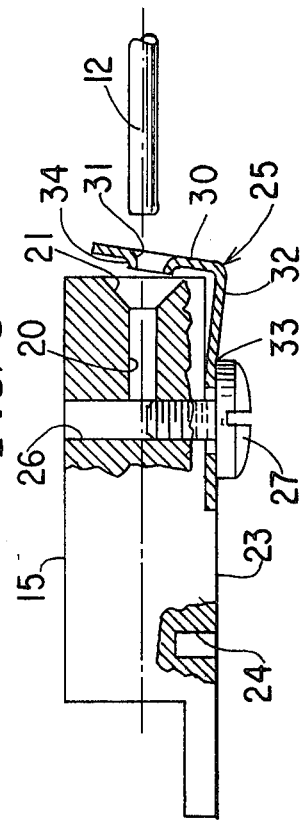
FIG. 3 is an enlarged elevational view of a terminal member embodying the invention.

Referring to FIG. 3, terminal member 15 has a longitudinal bore 20 extending into its forward end, the mouth of the bore preferably being conically countersunk, as shown at 21, to facilitate conductor entry. Tip conductor 12 is shown detached from terminal member 15, but in position for ready attachment.

The bottom surface 23 of terminal member 15 has a recess 24 to receive a projection (see FIG. 1) on the insulating housing to aid in positioning the member.

A spring member 25 is secured to terminal member 15. In the form of the invention shown, spring member 25 is attached to the bottom face 23 of member 15. As shown, member 15 has a transverse threaded opening 26 which intersects longitudinal bore 20 at the inner end thereof, and a set screw 27 in opening 26 secures spring member 25 to terminal member 15.

Spring member 25 has a portion 30 overlying the bored end of terminal member 15, the overlying portion 30 having an opening 31 to receive tip conductor 12. When spring member 25 is unflexed, as shown in FIG. 3, opening 31 is misaligned with bore 20, and when conductor 12 is pushed through opening 31 and into bore 20, spring member 25 is flexed to align opening 31 and bore 20. The bias of flexed spring member 25 is effective to secure conductor 12 in terminal member 15 and establish good electrical connection, as will be understood.

Conductor 12 is detachable from terminal member 15 simply by pulling tip 11 away from the member with requisite force.

Spring member 25, as illustrated, is generally L-shaped, the longer leg 32 having a slight bend at 33 adjacent set screw 27 to permit the aforesaid flexing. Opening 31 in overlying portion 30 (the shorter leg) is defined by a flared mouth to facilitate conductor insertion and by a cylindrical length 34 extending toward terminal member 15 for increasing surface contact between conductor 12 and spring member 25 to avoid undue wear.

Figure 4:
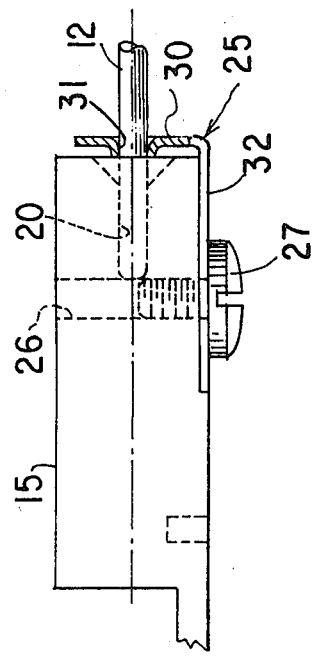
FIG. 4 is an elevational view of the terminal member of FIG. 3 showing a conductor detachably secured in place.

FIG. 4 shows conductor 12 secured mechanically and electrically to terminal member 15 by means of spring member 25, and it will be noted that spring member 25 is in flexed condition with opening 31 aligned with bore 20. Overlying portion 30 has moved transversely with respect to the bored end of terminal member 15, compared with the position shown in FIG. 3, to establish the flexed condition and aligned relationship.

Figure 5:
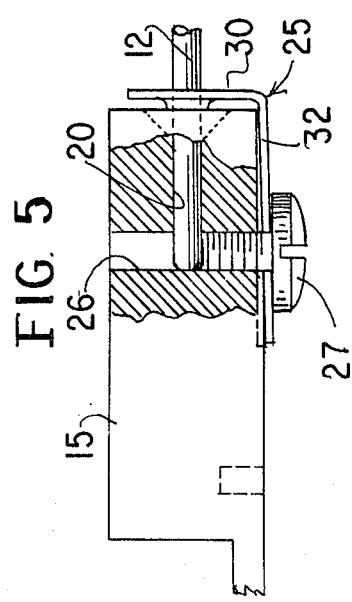
FIG. 5 is an elevational view, partly in section, of the terminal member showing a conductor secured positively therein by means of a set screw.

FIG. 5 illustrates the manner in which terminal member 15 of the invention may be used alternatively to lock conductor 12 positively within the member. Set screw 27 is retracted slightly, and conductor 12 is inserted so its free end enters transverse opening 26, after which screw 27 is tightened onto the conductor end. This insures maximum electrical contact between terminal member including spring member and the conductor, i.e. at the spring member and at each end of bore 20, such maximum contact being highly desirable in a high current, low voltage tool such as a cordless electric soldering iron.

Figure 6:
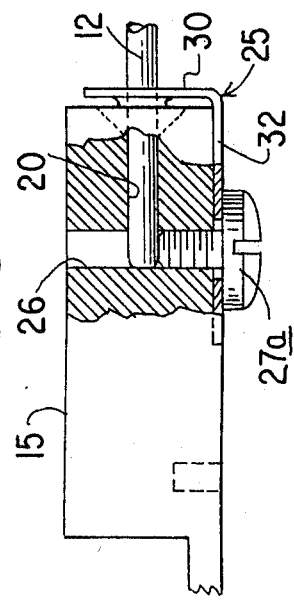
FIG. 6 is an elevational view, partly in section, of a modified terminal member.

FIG. 6 shows a slightly modified terminal member embodying the invention. Since the only modification involves the length of the set screw, the terminal member itself and the remaining parts of the terminal member bear the same reference numerals as in FIG. 5 and various other figures.

The modified terminal member shown in FIG. 6 has a set screw 27a which is somewhat shorter in length than set screw 27 shown in FIGS. 1, 3, 4 and 5. When set screw 27a is fully inserted in transverse threaded opening 26, the free end of the set screw does not enter the region aligned with the longitudinal bore 20. Accordingly, conductor 12 may be inserted all the way to the end of bore 20, as shown in FIG. 6, when the conductor is detachably secured by spring member 25.

When it is desired to secure conductor 12 positively in terminal member 15 by means of set screw 27a, the set screw is withdrawn completely, and spring member 25 is removed. Thereafter, set screw 27a is inserted in transverse opening 26 and clamped down on conductor 12, the clearance afforded by the removal of spring member 25 and the controlled length of the set screw cooperating to establish this clamped relation.

From the above description, it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. In an electric tool having a tip including a pair of electrical conductors and a pair of terminal members for said conductors, each terminal member comprising:
 a member of electrically conducting material having a longitudinal bore to receive a tip conductor, said member having a transverse threaded opening intersecting said longitudinal bore remote from the mouth of said longitudinal bore;
 a set screw in said transverse threaded opening for optionally locking the conductor positively in said member; and
 a spring member secured to said member by said set screw, said spring member having a portion overlying the bored end of said member and being movable transversely thereof in opposition to spring bias;
 said overlying portion of said spring member having an opening therein to receive a tip conductor, said opening when said spring member is unflexed being misaligned with said bore, whereby said spring member is flexed to align said opening and said bore to receive a conductor, and the conductor is secured mechanically and electrically to said terminal member by action of the flexed spring member and readily detachable therefrom.

2. The terminal member of claim 1 wherein the mouth of said longitudinal bore is conically countersunk to facilitate conductor entry.

3. The terminal member of claim 1 wherein said overlying portion of said spring member is spaced from said member and said opening in said overlying portion is defined by a flared mouth for facilitating insertion of the conductor and by a cylindrical length extending toward said member for increasing surface contact between conductor and spring member to avoid undue wear.

4. The terminal member of claim 1 wherein said spring member is generally L-shaped with one leg constituting said overlying portion and the other leg secured to a surface of said member, said other leg having a bend to permit flexing toward said member.

5. The terminal member of claim 1 wherein said set screw has a length such that the free end thereof when fully inserted in said transverse threaded opening enters said longitudinal bore and serves as a stop for the conductor, said set screw subject to partial withdrawal to clear said bore, whereby the conductor may enter said transverse opening and be secured by said set screw.

6. The terminal member of claim 1 wherein said set screw has a length such that the free end thereof when fully inserted in said transverse threaded opening does not enter the region aligned with longitudinal bore, whereby the conductor may engage the end of said bore, said set screw subject to complete withdrawal for removal of said spring member, said set screw thereafter subject to insertion in said threaded opening to secure said conductor positively.

* * * * *